United States Patent
Wanami et al.

(10) Patent No.: US 6,871,508 B2
(45) Date of Patent: Mar. 29, 2005

(54) AIR CONDITIONER WITH REDUCED NUMBER OF PIPING ACCESSORIES

(75) Inventors: Shigeki Wanami, Chiryu (JP); Mikiharu Kuwahara, Kariya (JP); Kazuo Kito, Nagoya (JP); Toshiya Nagasawa, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/395,676

(22) Filed: Mar. 24, 2003

(65) Prior Publication Data

US 2003/0177775 A1 Sep. 25, 2003

(30) Foreign Application Priority Data

Mar. 25, 2002 (JP) ........................................ 2002-083670

(51) Int. Cl.$^7$ .............................................. F25B 41/04
(52) U.S. Cl. ........................................ 62/196.4; 62/509
(58) Field of Search .............................. 62/196.4, 203, 62/204, 205, 196.1, 506, 507, 509, 216, 217, 222, 223, 224, 225

(56) References Cited

U.S. PATENT DOCUMENTS

| | | | | |
|---|---|---|---|---|
| 3,858,406 A | * | 1/1975 | Izumi | ........................ 62/217 |
| 5,101,640 A | * | 4/1992 | Fukushima et al. | ........ 62/196.4 |
| 5,291,941 A | | 3/1994 | Enomoto et al. | |
| 6,574,976 B2 | * | 6/2003 | Takano et al. | ............. 62/196.4 |

FOREIGN PATENT DOCUMENTS

| | | |
|---|---|---|
| DE | 43 37 349 | 5/1994 |
| EP | 1 170 560 | 1/2002 |
| GB | 2 272 506 | 5/1994 |
| JP | 2002-002312 | 1/2002 |

OTHER PUBLICATIONS

European Search Report dated Jul. 29, 2003 in corresponding EP Application No. 03 00 6704.

* cited by examiner

*Primary Examiner*—Harry B. Tanner
(74) *Attorney, Agent, or Firm*—Harness, Dickey & Pierce, PLC

(57) ABSTRACT

A refrigerant circuit in an air conditioner comprises a compressor that compresses a refrigerant, a condenser that liquefies the refrigerant, a pressure reducing device that reduces the pressure of the compressed refrigerant, and an evaporator that exchanges heat by utilizing the refrigerant and generates an air-conditioning air. The condenser comprises plural fin tubes, through which the refrigerant passes, two headers, to which both ends of the fin tubes are connected and which has a firm structure, upper and lower mounting brackets that are fixed to the headers, and vibration insulating materials that collaborate with pin members and support the condenser via the upper and lower mounting brackets. The valve unit is fixed to the header or to the upper or lower mounting bracket.

5 Claims, 4 Drawing Sheets

AIR CONDITIONER WITH REDUCED NUMBER OF PIPING ACCESSORIES

BACKGROUND OF THE INVENTION

1. Field of the Invention

The present invention relates to an air conditioner. Particularly, the present invention relates to an air conditioner for a vehicle. More particularly, the present invention relates to a condenser of an air conditioner for a vehicle and the peripheral piping accessories thereof.

2. Description of the Related Art

Conventionally, a general air conditioner for a vehicle comprises a cooling unit that cools a compartment by the adiabatic expansion of a refrigerant compressed by a compressor and a heating unit that heats a compartment by the cooling water that cooled an engine. In this case, it can be said that energy is utilized effectively and also facilities are utilized effectively because the heat of cooling water that cools an engine, which is the power source of the vehicle itself, is utilized as a heat source for heating.

Moreover, a hot gas cycle, in which a refrigerant compressed adiabatically by a compressor is directly utilized as a heat source for heating, has been proposed recently. In this case, it is possible to assist a hot water heater for heating and to preheat an air-conditioning air by running a cooling unit, which has been used only for cooling, in a hot gas cycle which will be described later and therefore, facilities can be utilized more effectively. On the other hand, from a standpoint of fuel consumption reduction or the like, a demand for a lighter vehicle has been increased recently.

A structure, in which such a hot gas cycle has been included in a conventional air conditioner system for a vehicle, is described with reference to FIG. 1 and FIG. 2. An air conditioner in FIG. 1 and FIG. 2 has a heating and cooling function and comprises a cooling unit 10 and a heating unit (not shown). As the present invention relates to the cooling unit 10, the heating unit is not shown schematically.

During the cooling operation performed by the cooling unit 10 shown in FIG. 1 and FIG. 2, a refrigerant is compressed by a compressor 1 and liquefied through a condenser 2. The liquefied refrigerant is reduced in pressure and expanded adiabatically by a pressure reducing device 3, and then is supplied to an evaporator 4, through a refrigerant pipe 33 and a refrigerant pipe 34 extending from the refrigerant pipe 33, and is then gasified therein. At this time the refrigerant cools the surroundings by absorbing heat from them. The evaporator 4 is contained in an air-conditioning duct and air supplied by an air blower 7 is cooled by exchanging heat with the evaporator 4 while the air passes through the evaporator 4 and is blown into and cools the inside of a vehicle room as air-conditioning air. After this, the refrigerant is drawn in by the compressor 1 and re-circulated.

During heating operation, on the other hand, heating is performed by the heating unit not shown schematically, the engine cooling water heated while it cools the engine (not shown) is supplied to the hot water heater, which is not shown, via a cooling water circulating pipe, air is supplied by the air blower to the hot water heater, contained in the air-conditioning duct, is heated thereby and is blown into the inside of the vehicle room as an air-conditioning air. The cooling water, that has passed through the hot water heater and has been decreased in temperature, circulates into the engine through the cooling-water circulating pipe and is heated again.

Here, it is possible to use a hot gas (HG) cycle in order to assist the hot water heater. The cooling unit 10 is operated simultaneously with the hot water heater during heating operation. A first switching valve 15 is provided between the compressor 1 and the condenser 2, a bypass pipe 18 is further provided between the first switching (stop) valve 15 and the compressor 1, a second switching (stop) valve 16 is provided on the bypass pipe 18, and a refrigerant bypass line is provided by connecting the bypass pipe 18 to the pipe 33 that provides communication between the pressure reducing device 3 and the evaporator 4. The refrigerant is introduced into the pipe 18 and bypasses the condenser 2 and the pressure reducing device 3 by closing the first switching valve 15 to shut off the channel that leads to the condenser 12. The refrigerant is compressed adiabatically by the compressor 1 and its temperature rises. The refrigerant, the temperature of which has risen, is introduced into the evaporator 4, that is, a heat exchanger, and air is heated because it is supplied, to flow through the evaporator 4, by the air blower 7. The air is blown into and heats the inside of a vehicle room. Such a method for using the cooling unit 10 is called the hot gas cycle. It is preferable that the first and second switching valves 15 and 16 are electromagnetic valves.

In the air conditioner that utilizes such a hot gas cycle, a throttle 17 is normally provided within the branch pipe 18 in addition to the second switching valve 16 and a check valve 19 is further arranged within the pipe 33 on the upstream side (on the pressure reducing device 3 side) of the part where the bypass pipe 18 is connected to the piping 33. A pressure sensor 14 may be provided on the upstream side of the first switching valve 15 on a discharge pipe 31 of the compressor 1. When a refrigerant piping circuit is configured in this way, it is preferable that the first switching valve 15, the second switching valve 16, the throttle 17, the check valve 19, the pipe 18, etc. are integrally formed into a unit. By being integrally formed into a unit, the portion including these components can be made more compact and lighter and the numbers of man-hours required in assembling these components can be reduced. As a result, it is possible to reduce the manufacturing and assembling costs. If mass production could be applied, a large economical merit would result by integrally forming these components into a unit.

By integrally forming the piping components into a unit, as described above, it is possible to form a valve unit 5 composed of, for example, the parts enclosed by the alternating long and short dashed line in FIG. 1. However, the valve unit 5 formed integrally into a unit in this way naturally becomes heavier than the individual weight of the switching valves 15 or 16 or the check valve 19. Therefore, where to install the valve unit 5 becomes a problem.

On the other hand, vibration of a vehicle is transmitted to the cooling unit 10 of an air conditioner while the vehicle is traveling because it is used onboard. Various pipes are connected to the condenser 2 that is included in the air conditioner, because of its function, as shown in FIG. 2, and accessories such as a refrigerant tank 21 are further attached thereto. The refrigerant tank 21 is connected to the condenser 2 via a refrigerant pipes and receives the refrigerant from the condenser 2, separates the vapor phase from the liquid phase, and returns the refrigerant vapor to the condenser 2. The condenser 2 is a heat exchanger of a fin tube type and has a thin plane shape as shown in FIG. 2. Moreover, it is generally made of aluminum and the structure thereof is made as thin as possible because of the demand for a lighter vehicle to realize high fuel consumption efficiency, or the like, therefore, the strength thereof satisfies only the minimum requirements.

From the standpoint of the strength of the condenser 2 and the lifetime of components thereof, it should be avoided that the vibrations of the vehicle are directly transmitted to the condenser 2 which has the structure described above. Therefore, the condenser 2 is generally attached to the vehicle body in such a way that vibration insulating materials 26 are arranged at two points, right and left, on the bottom face of the condenser 2 and the condenser 2 is supported through the vibration insulating materials 26, as shown in FIG. 2. Generally, the top face of the condenser 2 is pressed down by pins 27 at two points. The pin 27 may be supported by the vehicle body in such a way that it can move vertically. By configuring this way, the condenser 2 is attached to the vehicle body, without being fixed firmly, in such a way that the vibration of the vehicle body is absorbed and is not transmitted to the condenser 2. The pin 27 may comprise a rubber vibration insulating part internally to realize a vibration insulating effect.

Relating to the arrangement of the condenser 2 described above, it is preferable that the valve unit 5 is arranged near the condenser 2 because the valve unit 5 has many refrigerant pipes through which the valve unit 5 and the condenser 2 are communicated with each other. From this standpoint, it is preferable that the valve unit 5 is attached to fin tubes 28 of the condenser 2. However, the fin tubes 28 do not have enough strength for installation of the valve unit 5 because they are required to be light. Moreover, as the valve unit 5 is heavy, it needs to be installed on a firm structure. It may be an option that the valve unit 5 is installed on the vehicle body near the condenser 2, but in this case, even if a vibration insulating material is provided between itself and the vehicle body, the vibrations of the vehicle body are transmitted to the valve unit 5 and the condenser 2 and they are vibrated individually. Therefore, it is necessary that a pipe 32 and the pipe 33 that connect the valve unit 5 to the condenser 2 are made of a flexible material, or part of them is provided with a flexible material.

SUMMARY OF THE INVENTION

The problems described above being taken into account, the objective of the present invention is to provide a condenser that firmly supports a channel switching means, namely a valve unit, which is formed by integrally forming piping accessories such as switching (stop) valves on the discharge side piping of a compressor and, at the same time, that has a method for supporting the valve unit without using flexible piping accessories between the valve unit and the condenser, in an air conditioner for a vehicle which in general utilizes a hot gas cycle.

Another objective of the present invention is to make an air conditioner lighter than a conventional one and, at the same time, to utilize the inside of a vehicle effectively and reduce the manufacturing cost by reducing the number of components and simplifying the piping.

In order to achieve the above-mentioned objectives, the air conditioner in the first aspect of the present invention comprises a refrigerant circuit in which components are connected by pipes through which a refrigerant passes and which forms a closed piping circuit. The refrigerant circuit comprises a compressor that compresses the refrigerant and a condenser that is contiguous to the compressor on the downstream side thereof, is connected to the compressor by a pipe, and cools and liquefies the compressed refrigerant. The condenser comprises: plural fin tubes, through which the refrigerant compressed by the compressor passes and which serve as a heat-exchanging portion; two headers, to which both ends of the plural fin tubes are connected respectively and fluidly and which has a firm structure; at least one vibration insulating material that supports the condenser and has a vibration insulating effect; and at least one lower mounting bracket that is firmly fixed to at least one of the two headers, on the bottom face of which the vibration insulating material is provided, and through which the vibration insulating material joins the condenser. The refrigerant circuit comprises: a pressure reducing device that is contiguous to the condenser on the downstream side thereof, is connected to the condenser by a pipe, and reduces the pressure of the compressed refrigerant and expands it; at least one evaporator that is contiguously located on the downstream side of the pressure reducing device, is connected to the pressure reducing device by a pipe, thorough which the refrigerant passes, and has an air blower, wherein the evaporator is contained in an air-conditioning duct and air is supplied to the air-conditioning duct by the air blower. Therefore, the air passes through the at-least-one evaporator and is cooled or heated, a bypass pipe, through which the refrigerant bypasses the condenser and the pressure reducing device and flows through the evaporator; and a channel switching means that has a function to change the flow routes of the refrigerant, from the compressor, between the condenser and the bypass pipe and is integrally formed with plural components into one unit. The channel switching means is attached to either of the two headers of the condenser.

In this way, in the present invention, it is possible to firmly fix the channel switching means to the condenser and to eliminate the flexible piping means to be provided on the plural pipes, for absorbing vibrations, between the channel switching means and the condenser. Therefore, the weight of the condenser can be reduced and the piping can be simplified.

In the air conditioner in the second aspect of the present invention, according to the first aspect, the condenser comprises at least one upper mounting bracket, that is aligned to the at-least-one lower mounting bracket in the vertical direction, is firmly fixed to at least one of the headers, and assists the installation of the condenser, and at least one pin member that is aligned to the at-least-one vibration insulating material in the vertical direction, presses down the condenser via the upper mounting bracket, and collaborates with the vibration insulating material in enabling the support of the condenser.

Alternatively, in the third aspect of the present invention, according to either of the first aspect or in the second aspect, the channel switching means is attached to the upper or lower mounting bracket of the condenser, which has a firm structure. In this way, it is also possible for the present invention to eliminate the flexible piping means.

As another alternative, in the fourth aspect of the present invention, according to any one of the first to the third aspects, the channel switching means comprises at least two parts among: a first switching valve provided between the compressor and the condenser; at least part of the bypass pipe connected to the pipe communicating the pressure reducing device with the evaporator; a second switching valve arranged within the bypass pipe; a throttle arranged within the bypass pipe, and a check valve arranged on the upstream side of the connecting part where the bypass pipe is connected to the pipe communicating the pressure reducing device with the evaporator.

Alternatively, the channel switching means may comprise piping accessories, such as a pressure sensor provided on the upstream side of the first switching valve 15 in the discharge pipe 31 of the compressor other than those described above.

In another aspect of the present invention, the first and/or the second switching valves may be electromagnetic valves.

The air conditioner in the sixth aspect of the present invention comprises a refrigerant circuit in which components are connected by pipes through which a refrigerant passes and which forms a closed piping circuit. The refrigerant circuit comprises a compressor that compresses the refrigerant and a condenser that is contiguous to the compressor on the downstream side thereof, is connected to the compressor by a pile, and cools and liquefies the compressed refrigerant. The condenser comprises: plural fin tubes, through which the refrigerant compressed by the compressor passes and which serve as a heat-exchanging portion; two headers, to which both ends of the plural fin tubes are connected respectively and fluidly and which has a firm structure; at least one vibration insulating material that supports the condenser and has a vibration insulating effect; and at least one lower mounting bracket that is firmly fixed to at least one of the two headers, on the bottom face of which the vibration insulating material is provided, and through which the vibration insulating material joins the condenser. The refrigerant circuit comprises: a pressure reducing device that is contiguous to the condenser on the downstream side thereof, is connected to the condenser by a pipe, and reduces the pressure of the compressed refrigerant and expands it; at least one evaporator that is contiguously located on the downstream side of the pressure reducing device, is connected to the pressure reducing device by a pipe, through which the refrigerant passes, and has an air blower, wherein the evaporator is contained in an air-conditioning duct and air is supplied to the air-conditioning duct by the air blower, therefore, the air passes through the at-least-one evaporator and is cooled or heated; a bypass pipe, through which the refrigerant bypasses the condenser and the pressure reducing device and flows through the evaporator; and a channel switching means that has a function to change the flow routes of the refrigerant, from the compressor, between the condenser and the bypass pipe and is integrally formed with plural components into a unit. The channel switching means is attached to the lower mounting bracket.

The air conditioner in the seventh aspect of the present invention comprises a refrigerant circuit in which components are connected by pipes through which a refrigerant passes and which forms a closed piping circuit. The refrigerant circuit comprises a compressor that compresses the refrigerant and a condenser that is contiguous to the compressor on the downstream side thereof, is connected to the compressor by a pipe, and cools and liquefies the compressed refrigerant. The condenser comprises: plural fin tubes, through which the refrigerant compressed by the compressor passes and which serve as a heat-exchanging portion; two headers, to which both ends of the plural fin tubes are connected respectively and fluidly and which has a firm structure; at least one vibration insulating material that supports the condenser and has a vibration insulating effect; and at least one lower mounting bracket that is firmly fixed to at least one of the two headers, on the bottom face of which the vibration insulating material is provided, and through which the vibration insulating material joins the condenser. The refrigerant circuit comprises: a pressure reducing device that is contiguous to the condenser on the downstream side thereof, is connected to the condenser by a pipe, and reduces the pressure of the compressed refrigerant and expands it; at least one evaporator that is contiguously located on the downstream side of the pressure reducing device, is connected to the pressure reducing device by a pipe, through which the refrigerant passes, and has an air blower, wherein the evaporator is contained in an air-conditioning duct and air is supplied to the air-conditioning duct by the air blower, therefore, the air passes through the at-least-one evaporator and is cooled or heated; a refrigerant tank that is connected to the condenser via refrigerant pipes, a bypass pipe, through which the refrigerant bypasses the condenser and the pressure reducing device and flows through the evaporator; and a channel switching means that has a function to change the flow routes of the refrigerant, from the compressor, between the condenser and the bypass pipe and is integrally formed with plural components into a unit. The channel switching means is attached to the refrigerant tank.

According to the aspects of the present invention described above, in the air conditioner for a vehicle which utilizes a hot gas cycle it is possible to firmly support a channel switching means that is formed by integrally forming piping accessories, such as switching valves on the compressor discharge side, into one unit and, at the same time, to eliminate flexibly piping accessories between the channel switching means and the condenser. Moreover, in the present invention it is possible to make an air conditioner lighter than conventional ones and, at the same time, to utilize the inside of a vehicle effectively and reduce the manufacturing cost by reducing the number of components and simplifying the piping in the air conditioner.

In another aspect of the present invention, the first to third aspects of the present invention and their variants may be applied to an air conditioner other than that for a vehicle.

The present invention may be more fully understood from the description of the preferred embodiments of the invention set forth below, together with the accompanying drawings.

DESCRIPTION OF THE PREFERRED EMBODIMENT

The installation of the valve unit 5 to the condenser of the present invention will be described below in detail based on the embodiments and with reference to the drawings. In FIG. 3, the condenser 2 in the first embodiment is shown and the components of the cooling unit 10 are similar to those of an air conditioner that utilizes a general hot gas cycle shown in FIG. 1 and FIG. 2 are designated by the reference symbols same as those corresponding to the components shown in FIG. 1 and FIG. 2.

Figure 1:
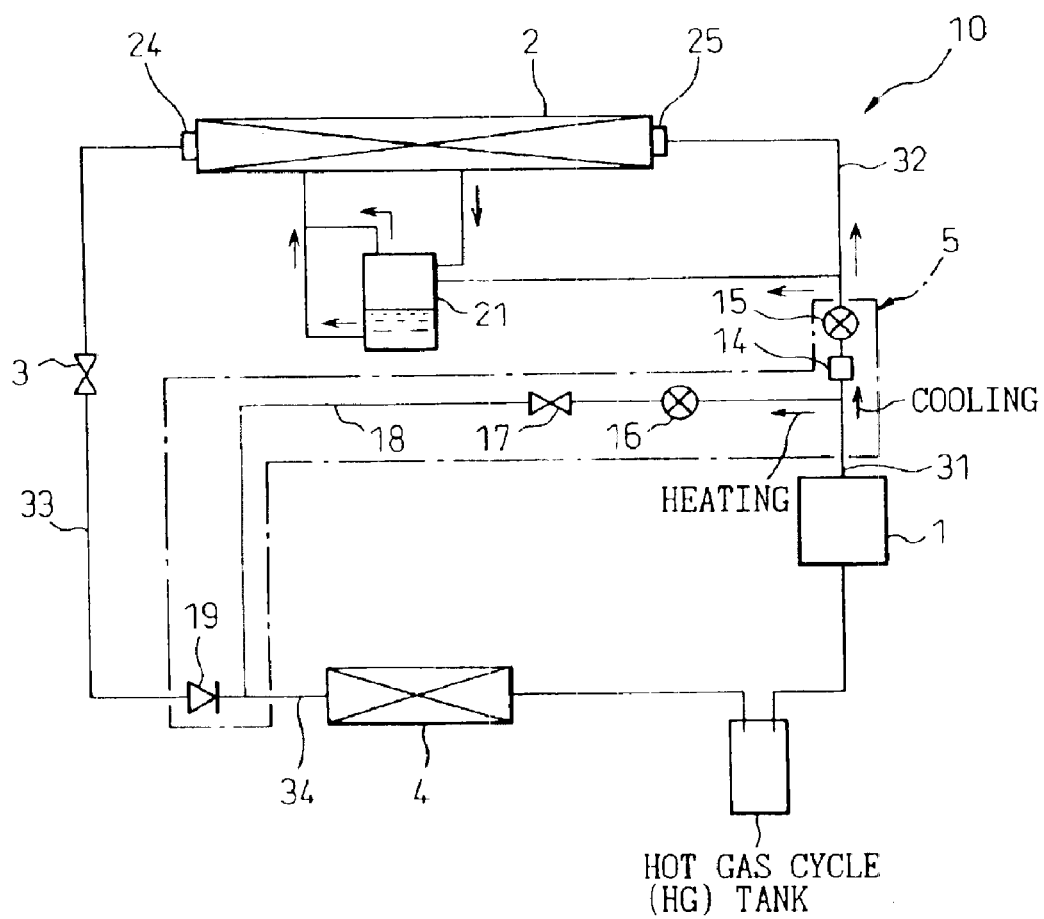
FIG. 1 is an schematic diagram of a refrigerant circuit of an air conditioner that can use a condenser of the present invention.
Figure 2:
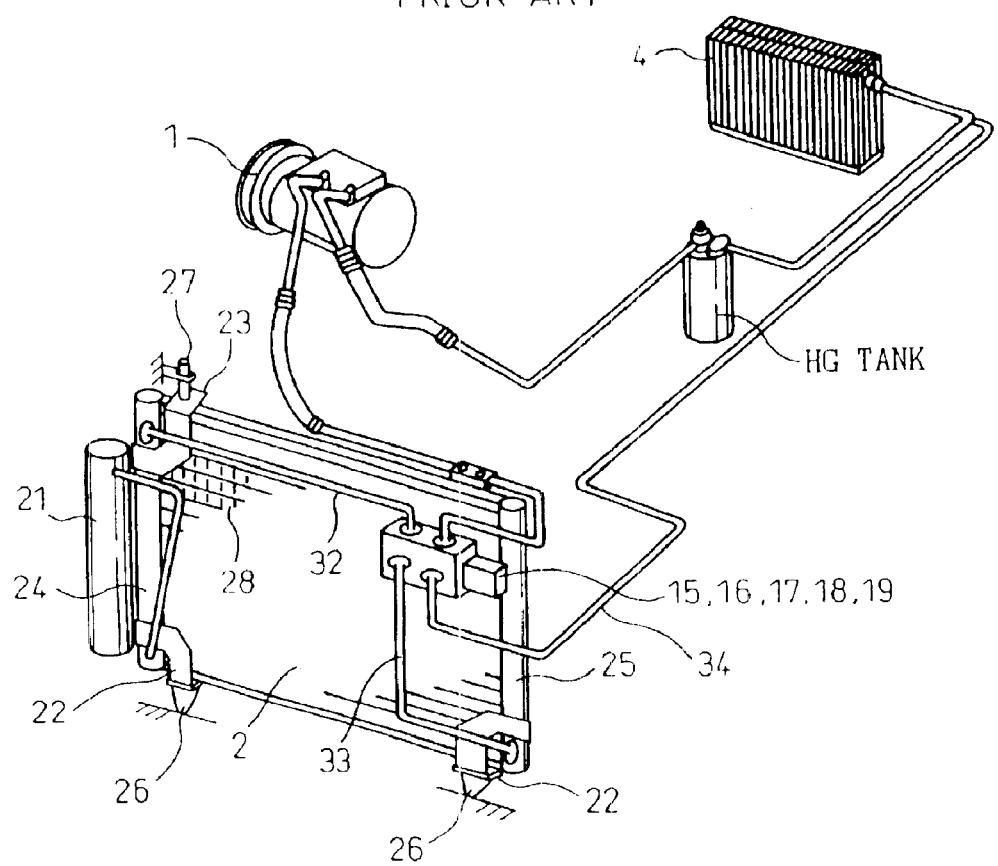
FIG. 2 is a diagrammatic perspective view of the air conditioner in FIG. 1 which can use a condenser of the present invention.
Figure 3:
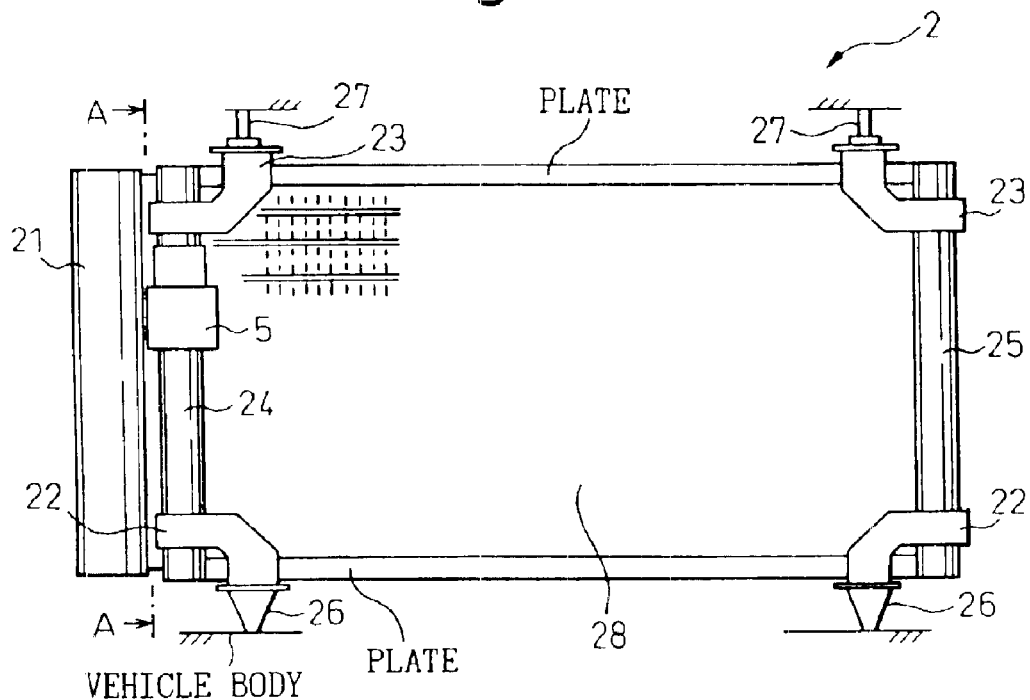
FIG. 3 is a diagrammatic front view of a condenser in a first embodiment of the present invention.
Figure 4:
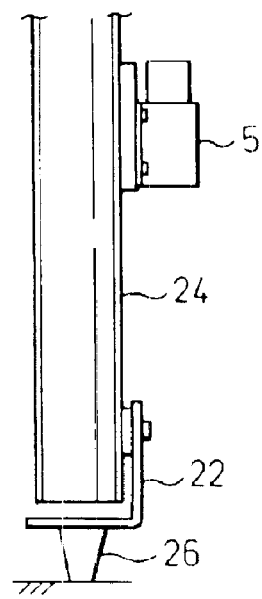
FIG. 4 is a sectional view taken along the line A—A in FIG. 3.

As the structure, operation, function, etc. of the air conditioner and the condenser 2 thereof in the first embodiment of the present invention shown in FIG. 3 are basically same as those of the air conditioner, shown in FIG. 1 and FIG. 2, that utilizes a general hot gas cycle, the description of the circuits and structure is given only for the differences between FIG. 3 and FIGS. 1 and 2 to avoid duplication. (This also applies to FIG. 5.)

In the present embodiment, the condenser 2 is a heat exchanger of a fin tube type, and comprises the plural fin tubes 28, and the fin tubes 28 are generally supplied with air by the air blower 7 shown in FIG. 1, resulting in exchange of heat between air and the refrigerant flowing through the fin tubes 28. Although the fin tubes 28 are made of aluminum in the present embodiment, they may be made of other materials.

Both ends of the plural fin tubes 28 are fluidly connected to two headers 24 and 25, respectively, which are arranged vertically at the right and left ends of the plural fin tubes 28, as shown in FIG. 3, and the headers 24 and 25 and the fin tubes 28 form a refrigerant channel. The headers 24 and 25 are made of aluminum, but they have a firm structure with a fixed thickness because they contain the refrigerant compressed to a high pressure. The refrigerant tank 21 that is connected to the header 24 is attached to the outside of the header 24 located to the left, when viewed from the front, in FIG. 3. As shown in FIG. 3, the headers 24 and 25 are arranged in such a way as to surround the fin tubes 28. The header may be made of a material other than aluminum.

At the four corners of the condenser 2, the lower and upper mounting brackets 22 and 23 are firmly fixed to the headers 24 and 25 by using bolts or the like. The fixing method is not limited to that which uses bolts, but already-known methods such as that which uses clamps or welding may be employed. Onto the bottom faces of the right and left lower mounting brackets 22, vibration insulating materials 26 (two in the present embodiment) that are made of materials such as rubber and have a vibration insulating performance are attached as shown in FIG. 3. The vibration insulating materials 26 support the condenser 2 via the lower mounting brackets 22 and serve as a vibration insulating device that prevents vibrations of the vehicle body from being transmitted to the condenser 2. On the other hand, onto the top faces of the right and left upper mounting brackets 23, which are provided at the two upper corners of the condenser 2 in such a way as to correspond to the lower mounting brackets 22, the pin members 27 are attached in such a way as to come into contact with and press down the condenser 2 via the upper mounting brackets 23, and as the pin members 27 are fixedly attached to the vehicle body, they can press down the condenser 2 by using the reactive force from the vehicle body. The right and left pin members 27 are arranged in such a way as to be aligned to the vibration insulating materials 26 in the vertical direction, respectively. As described above, the pin members 27 press down the condenser 2, therefore, they collaborate with the vibration insulating materials 26, which come into contact with the vehicle body and support the condenser 2, in stabilizing the condenser 2 in the vertical direction and, at the same time, they stabilize the condenser 2 in the horizontal direction by the frictional force produced by the pressing-down force thereof and the mass of the condenser 2. In this way, the condenser 2 is fixed by the vibration insulating materials 26 and the pin members 27, so that the condenser 2 are prevented from vibrating. In the present embodiment, the upper mounting brackets 23 and the lower mounting brackets 22 are provided in twos, respectively, but other numbers of them may be provided as far as a firm mounting structure is provided.

The valve unit 5 shown in FIG. 3 has, as described above, the function that changes the flow routes of the refrigerant, from the compressor 1, between the condenser 2 and the bypass pipe 18, is formed by integrally forming the piping accessories around the condenser 2 into a unit, and therefore, and is considerably heavy as a whole. The valve unit 5 in the first embodiment is attached to the header 24 on the left-hand side and the attaching method may be already-known attaching methods such as that which uses bolts via a plate, welding, and clamping.

In this way, the valve unit 5 is integrally assembled with the condenser 2 and the vibrations from the vehicle body to the valve unit 5 as well as to the condenser 2 are absorbed by the vibration insulating material 26, therefore, the present invention enables the valve unit 5 to be fixed to the condenser 2 and parts such as flexible hoses to be conventionally provided on the plural pipes 32 and 33 between the valve unit 5 and the condenser 2 in order to absorb vibrations can be eliminated.

Figure 5:
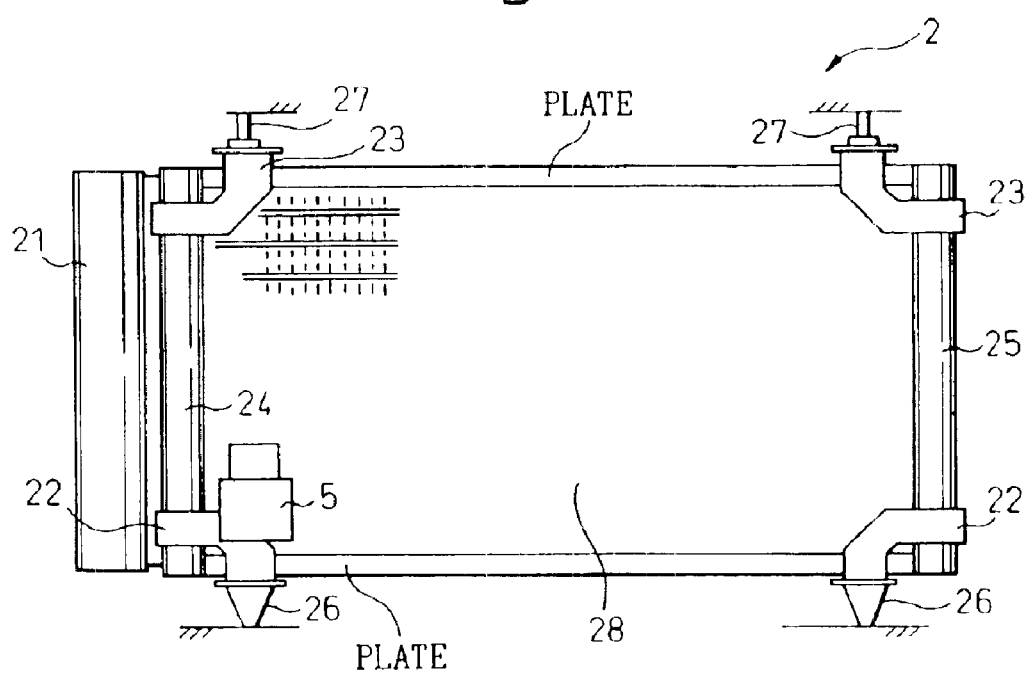
FIG. 5 is a diagrammatic front view of a condenser in a second embodiment of the present invention.

Alternatively, in the second embodiment of the present invention the valve unit 5 is fixed to the lower mounting bracket 22, located on the left-hand side, which has a firm structure, as shown in FIG. 5. In this way, parts such as the flexible hoses can also be eliminated in the present invention. Alternatively, the valve unit 5 may be attached to the upper mounting bracket 23 or to the refrigerant tank 21.

Alternatively, the valve unit 5 may comprise piping accessories other than those, such as the pressure sensor 14, provided on the upstream side of the first switching valve 15 on the discharge pipe 31 of the compressor 1, and may exclude some parts of the piping accessories described above.

The first and/or the second switching valves 15 and 16 may be electromagnetic valves. The first switching valve 15 and the second switching valve 16 may be integrally formed into a three way valve. As described above, the valve unit 5 need not contain specific piping components and the components included in the valve unit 5 may be changed according to the design of the refrigerant circuit.

In the present invention, the arrangement of the valve unit 5, that is a unit, into which the piping accessories around the condenser 2 in an air conditioner that utilizes a hot gas cycle are integrally formed, is described, but the air conditioner need not utilize the hot gas cycle, therefore, the valve unit 5 in this case need not contain the switching valve 15 and/or the switching valve 16 in FIG. 1.

In the case where the air conditioner comprises a condenser that is used in a refrigerant circuit which utilizes a hot gas cycle and is made light as shown in the embodiments, the condenser including the installation method of the valve unit in the present invention can be applied to an arbitrary air conditioner.

According to the constitution of the present invention described above, it is possible to simplify and reduce in weight the piping components around the condenser, and to reduce the manufacturing cost.

While the invention has been described by reference to specific embodiments chosen for the purposes of illustration, it should be apparent that numerous modifications could be made thereto by those skilled in the art without departing from the basic concept and scope of the invention.

What is claimed is:

1. An air conditioner, comprising a refrigerant circuit in which components are connected by pipes through which a refrigerant passes and which forms a closed piping circuit:

wherein the refrigerant circuit comprising a compressor that compresses the refrigerant and a condenser that is contiguous to the compressor on the downstream side thereof, is connected to the compressor by a pipe, and cools and liquefies the compressed refrigerant, wherein the condenser comprises plural fin tubes, through which the refrigerant compressed by the compressor passes and which serve as a heat-exchanging portion, two headers, to which both ends of the plural fin tubes are connected respectively and fluidly and which have a firm structure, at least one vibration insulating material that supports the condenser and has a vibration insulating effect, and at least one lower mounting bracket that is firmly fixed to at least one of the two headers, on the bottom face of which the vibration insulating material is provided, and though which the vibration insulating material joins the condenser, wherein the refrigerant circuit further comprises a pressure reducing device that is contiguous to the condenser on the downstream side thereof, is connected to the condenser by a pipe, and reduces the pressure of the compressed refrigerant and expands it, at least one evaporator that is contiguously located on the downstream side of the pressure reducing device, is connected to the pressure reducing device by a pipe, through which the refrigerant passes and has an air blower, wherein the evaporator is contained in an air-conditioning duct and air is supplied to the air-conditioning duct by the air blower, therefore, the air passes through the at-least-one evaporator and is cooled or heated, a bypass pipe, through which the refrigerant bypasses the condenser and the pressure reducing device and flows through the evaporator, and a channel switching means that has a function to change the flow routes of the refrigerant, from the compressor, between the condenser and the bypass pipe and is integrally formed with plural components into a unit; and wherein the channel switching means is attached to the lower mounting bracket.

2. An air conditioner, as set forth in claim 1, wherein the condenser comprises at least one upper mounting bracket that is aligned to the at-least-one lower mounting bracket in the vertical direction, is firmly fixed to at least one of the headers, and assists the installation of the condenser, and at least one pin member that is aligned to the at-least-one vibration insulating material in the vertical direction, presses down the condenser via the upper mounting bracket, and collaborates with the vibration insulating material in enabling the support of the condenser.

3. An air conditioner, as set forth in claim 1, wherein the channel switching means is attached to the upper or lower mounting bracket, which is a firm structure of the condenser.

4. An air conditioner, as set forth in claim 1, wherein the channel switching means comprises at least two parts among:

a first switching valve provided between the compressor and the condenser;

at least part of the bypass pipe connected to the pipe communicating the pressure reducing device with the evaporator;

a second switching valve &ranged within the bypass pipe;

a throttle arranged within the bypass pipe; and a check valve arranged on the upstream side of the connecting part where the bypass pipe is connected to the pipe communicating the pressure reducing device with the evaporator.

5. An air conditioner, as set forth in claim 3, wherein the first and/or second switching valves are electromagnetic valves.

* * * * *